United States Patent [19]
Grotzinger

[11] Patent Number: 4,882,774
[45] Date of Patent: Nov. 21, 1989

[54] LASER BEAM DATA VERIFICATION SYSTEM

[75] Inventor: Timothy L. Grotzinger, Palmyra, Pa.
[73] Assignee: Laser Communications, Inc., Lancaster, Pa.
[21] Appl. No.: 236,150
[22] Filed: Aug. 25, 1988
[51] Int. Cl.$^4$ ............................................... H04B 9/00
[52] U.S. Cl. .................................. 455/617; 455/600; 455/608; 455/618
[58] Field of Search .............. 455/600, 606, 607, 608, 455/609, 610, 611, 612, 613, 617, 618, 619

[56] References Cited

U.S. PATENT DOCUMENTS

| | | | |
|---|---|---|---|
| 3,131,258 | 4/1964 | O'Neill | 375/88 |
| 4,399,565 | 8/1983 | Jarret | 455/613 |
| 4,481,678 | 11/1984 | Sakamoto | 455/619 |
| 4,633,523 | 12/1986 | Witkover | 455/617 |

Primary Examiner—Robert L. Griffin
Assistant Examiner—L. Van Beek
Attorney, Agent, or Firm—Martin Fruitman

[57] ABSTRACT

A beam failure alarm and protection circuit for a laser communications link. In order to distinguish a true beam failure from a mere absence of data to be transmitted, an alternate signal is produced in the transmitter whenever no data is available for transmission. The alternate signal is of a much higher frequency than true signals and is bandpass filtered. Its absence is used at the receiver to shut down the data output and trigger an alarm if the receiver senses no alternate signal within the maximum time that a typical burst of data would terminate.

7 Claims, 1 Drawing Sheet

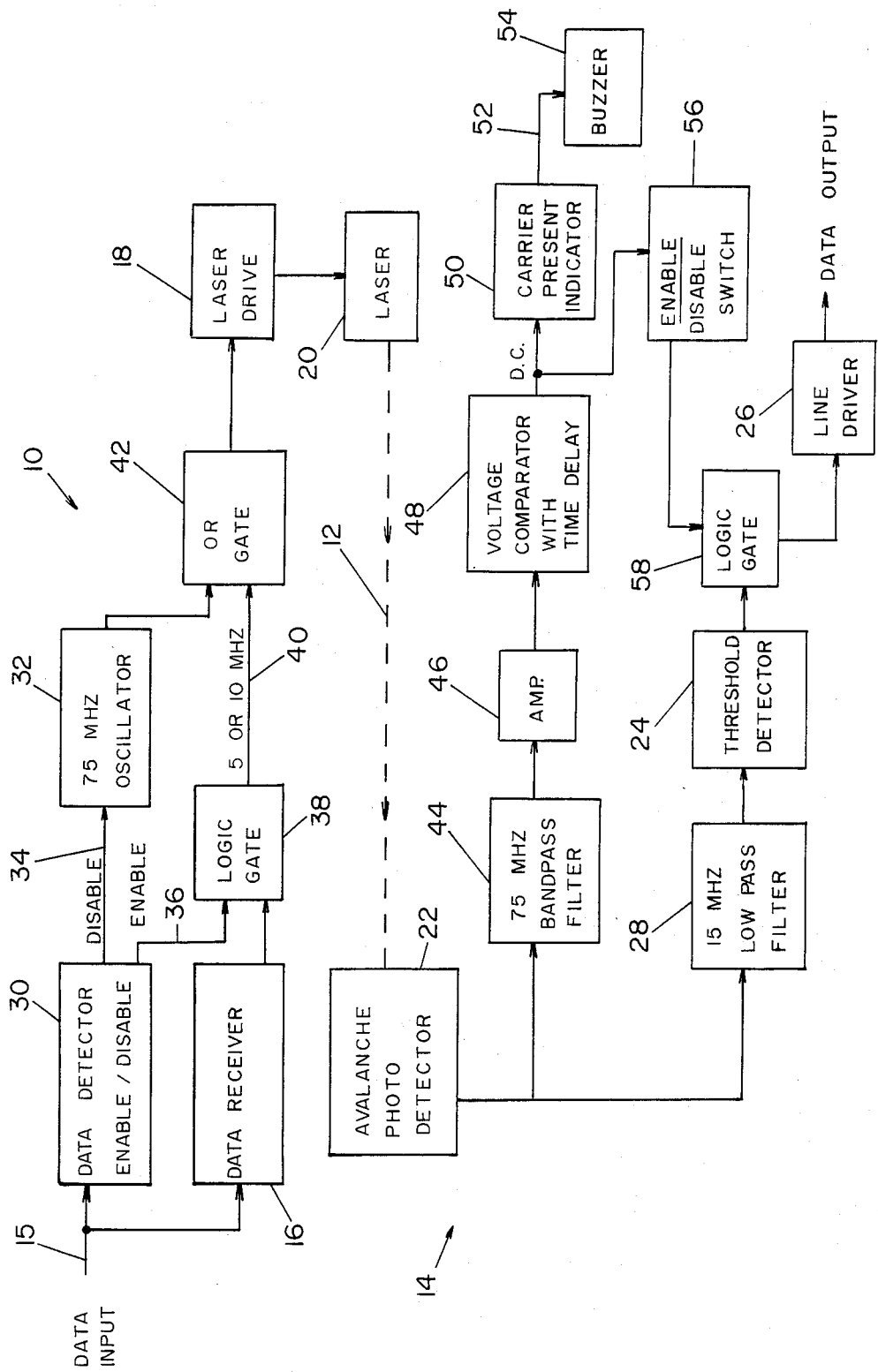

4,882,774

LASER BEAM DATA VERIFICATION SYSTEM

SUMMARY OF THE INVENTION

This invention deals generally with telecommunications and more particularly with a laser beam communications link.

Laser beam data links which use avalanche photodetectors have a particular problem when the laser transmitter fails or the laser link becomes misaligned sufficiently to cause the laser beam to miss the photodetector. Avalanche photodetectors have the peculiar characteristic of generating high noise signals when they are not subject to incoming light, and in a data communication link this noise level can produce random erroneous data signals. Moreover, the high noise signal output makes it impossible to determine the absence of the laser beam if that determination is being made merely on the presence or absence of a photodetector output signal. Furthermore, the very nature of data transmission can produce lapses of data when none is available for transmission, and in most laser transmission circuits this legitimate absence of data results in no laser beam being transmitted.

Under such circumstances, even if the noise discrimination problem of an avalanche photodetector were solved, the circuit would still be unable to distinguish between a legitimate time period when no data is being transmitted and an actual failure of the laser beam.

The present invention has solved this problem in a manner which restricts the alarm and protection response to only those times when an actual beam failure has occurred, and it does not improperly respond when there is a mere lack of data to be transmitted.

This ability to discriminate between two situations which the photodetector can not usually distinguish is attained by generating an alternate signal at the transmitter when there is no legitimate data to transmit. The alternate signal is then transmitted to the receiver by means of the laser beam, and since it is clearly distinguishable from noise signal by circuitry following the photodetector, it is used to keep open a gate in the data output line.

During normal operation the circuitry of the invention simply substitutes and transmits the alternate signal when there is no data signal and decodes the alternate signal at the receiver to hold open the data output.

However, under the circumstances of a loss of the laser beam at the receiver the alternate signal is no longer available and after a short period of time equivalent to the longest expected burst of data, the data output line is shut off and an alarm signal initiated. With the data output line shut off any noise being generated by the photodetector due to lack of light signal is prevented from being transmitted further, and with the alarm indicator activated, the circuit has identified the problem of the absence of the laser beam. The present invention therefore fulfills both requirements which the beam failure must activate, but does so only when trouble actually does occur.

BRIEF DESCRIPTION OF THE DRAWING

The FIGURE is a simplified block diagram of the preferred embodiment of the invention.

DETAILED DESCRIPTION OF THE INVENTION

The preferred embodiment of the invention is shown in the FIGURE in simplified block diagram form in which the arrows indicate the direction of signal flow. The FIGURE pictures transmitter 10 from which laser beam 12 is directed to receiver 14. In a typical prior art system, transmitter 10 would include only data receiver 16 interconnected with laser drive 18 which powers laser 20. Likewise, receiver 14 would typically include only avalanche photodetector 22, threshold detector 24 and line driver 26 to feed data back into a conventional data network (not shown).

The addition of 15 MHZ low pass filter 28 might be a typical effort to solve the problem of noise generation by photodetector 22, but it can not prevent noise generated at a lower frequency from being treated as if it were legitimate signal. Moreover, as previously discussed, such low frequency noise is to be expected both between legitimate data bursts and when laser beam 12 is misdirected away from photodetector 22 or transmitter 10 malfunctions.

In the present invention this problem is solved by the addition of several stages which, when combined with the conventional laser transmitter and receiver, result in a fool-proof circuit which protects the data network against noise generated by photodetector 22 in the absence of laser beam 12.

This is accomplished by first adding data detector circuit 30 in parallel with data receiver 16 so that data detector 30 monitors the presence or absence of data being received at transmitter input 15.

Data detector 30, which includes enable and disable signal outputs, is a standard ETHERNET stage. It is described in IEEE specification 802.3. Data detector 30 is conventionally used to control access to a data network. It usually prevents a data burst signal of insufficient amplitude from having access to a data line.

However, in transmitter 10 of the present invention, data detector 30 is also used to control the operation of oscillator 22 which generates an alternate signal when no data signal is being received at transmitter input 15. Thus, when data is being generated, it is received by both data receiver 16 and data detector 30. Data detector 30 therefore generates a disable signal on signal path 34 and generates an enable signal on signal path 36.

Therefore, under the circumstances of normal data input to transmitter 10, oscillator 32 is not operating and the signal from data receiver 16 is sent to logic gate 38 which passes the data signal through to signal line 40 because logic gate 38 is also receiving the enable signal from line 36. The normal signal then progresses through OR gate 42 to laser drive 18 which activates laser 20 to transmit the data to receiver 14 on laser beam 12 in normal fashion.

If, however, no data is available at the transmitter input 15, data detector 30 does not produce a signal to disable oscillator 32 and does not produce a signal to permit signal to pass thru logic gate 38. Therefore oscillator 32 operates to generate an alternate signal which is fed through OR gate 42 and to laser drive 18, laser 20 and receiver 14, just as the normal signal would be.

However, while the normal data signal is typically 5 or 10 MHZ, the alternate signal in the preferred embodiment is 75 MHZ. The requirement for frequency selection of the alternate signal is essentially that it must be easily distinguishable from the normal signal at the receiver. This suggests that it should be a much higher frequency than the normal signal so it can be separated by a low pass filter, and a frequency higher than the lower harmonics is also desireable for greater east of separation. The alternate frequency appears to be optimum when it is above the fifth harmonic of the normal frequencies.

As can be appreciated from the foregoing description, laser transmitter 10 when in normal operation should be constantly switching back and forth between the normal and the alternate frequencies, and regardless of whether data is being transmitted at any particular time, photodetector 22 in laser receiver 14, should always be receiving some signal, either normal data or the alternate frequency signal. Thus, at no time during proper operation does photodetector 22 see a no light condition, and therefore, at no time will it generate random noise to yield spurious data.

Although the alternate signal prevents spurious data generation at receiver 14 it is also desireable to distinguish when, due to a malfunction of laser 20 or misalignment, the signal from photodetector 22 is being caused by absence of beam and should therefore be prevented from entering the data network.

This discrimination is also accomplished by use of the alternate signal. Thus, when photodetector 22 receives normal data the signal is passed through low pass filter 28, verified as sufficient by threshold detector 24 and sent to gate 58. Gate 58 is furnished an enabling signal by enable-disable switch 56 and therefore passes the signal to line driver 26 and to the following data network (not shown).

When the alternate signal is received by photodetector 22, it is blocked by low pass filter 28 but passes through bandpass filter 44 and amplifier 46 to voltage comparator 48. Voltage comparator 48 verifies that the alternate signal is sufficient to not be mere noise and then sends a d.c. voltage signal to enable-disable switch 56. This signal is continued for a specific time period after the alternate signal stops to assure that any normal length data burst will be allowed to pass through the normal signal path. However, if the alternate signal is not initiated again before the prescribed time period, no further signal will be sent to enable-disable switch 56 and no data signal will be permitted to reach line driver 26. The logical conclusion to be derived from the absence of alternate signal after the prescribed time period permitted for a data burst is that there has been a malfunction in either the transmitter or the laser beam, and it therefore follows that no data should be sent out.

Receiver 14 also provides information to this effect to aid in servicing the system. The signal from voltage comparator 48 is also sent to carrier indicator 50 which includes an indicator light which remains on as long as the output voltage is available from voltage comparator 48. Since that voltage is continuous when the system is operating properly, the light is always on, and carrier indicator 50 does not generate and feed an alarm signal to line 52 and warning buzzer 54. However, if no signal is received by carrier indicator 50, its indicator light goes off and a signal is generated on line 52 to activate warning buzzer 54.

The present invention therefore furnishes a data verification system for a laser communication link which not only does not generate spurious data between data bursts, but also indicates if there is a true malfunction in the laser transmitter or laser beam.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. An apparatus for verification of the presence of a laser beam in a laser communications link comprising:
    an alternate signal generator;
    a signal substitution means connected to the alternate signal generator and to a laser beam transmitter sending out a laser beam to cause the transmitter to transmit an alternate signal generated by the alternate signal generator when no other signal is available at the transmitter input for transmission by the laser beam transmitter;
    a receiver receiving the laser beam and including a photodetector which converts the laser beam impinging upon it to a related electrical signal;
    a signal filter means connected to the photodetector and passing through signals of the frequency of the alternate signal, but blocking other signal frequencies; and
    a signal control means connected to the signal filter means, preventing any signal from being sent out from the receiver except for a specific time period after the last alternate signal which has been received.

2. The apparatus of claim 1 wherein the signal substitution means comprises a signal detection circuit connected to the input of the laser beam transmitter and to the alternate signal generator and sensing the presence of signal on the input to the laser beam transmitter to disable the alternate signal generator when there is signal on the input of the laser beam transmitter.

3. The apparatus of claim 1 further including an OR circuit connected to the alternate signal generator, to a signal source connected to the input of the laser beam transmitter and to a laser drive signal path so that the OR circuit permits either the alternate signal or the signal from the input of the transmitter to be fed to the laser drive signal path.

4. The apparatus of claim 1 wherein the alternate signal is a higher frequency than any other signal anticipated within the apparatus.

5. The apparatus of claim 1 further including an alarm circuit connected to the signal control means to indicate when no alternate signal is being received by the receiver after the specific time period.

6. The apparatus of claim 1 wherein the signal filter means is a bandpass filter.

7. The apparatus of claim 1 further including an indicator circuit, connected to the signal control means, which maintains an indicator on while the alternate signal is being received and for the specific time period afterwards.

* * * * *